United States Patent
Zurovec et al.

(10) Patent No.: US 10,295,689 B2
(45) Date of Patent: May 21, 2019

(54) CONTROLLED CURVATURE BEND DEVICE AND METHOD

(71) Applicant: SERCEL, INC., Houston, TX (US)

(72) Inventors: Michael Zurovec, Wallace, TX (US); Andrew Lawrence, League City, TX (US); Jinjun Wang, Cypress, TX (US)

(73) Assignee: SERCEL, INC., Houston, TX (US)

( * ) Notice: Subject to any disclaimer, the term of this patent is extended or adjusted under 35 U.S.C. 154(b) by 184 days.

(21) Appl. No.: 15/283,668

(22) Filed: Oct. 3, 2016

(65) Prior Publication Data

US 2018/0097348 A1     Apr. 5, 2018

(51) Int. Cl.
| | | |
|---|---|---|
| *G01V 1/38* | (2006.01) | |
| *H02G 15/00* | (2006.01) | |
| *H02G 15/007* | (2006.01) | |
| *H02G 1/10* | (2006.01) | |
| *H02G 9/02* | (2006.01) | |
| *G01V 1/20* | (2006.01) | |
| *B63B 21/66* | (2006.01) | |
| *H02G 3/04* | (2006.01) | |

(52) U.S. Cl.
CPC ............ *G01V 1/3808* (2013.01); *G01V 1/201* (2013.01); *H02G 1/10* (2013.01); *H02G 9/02* (2013.01); *H02G 15/007* (2013.01); *B63B 21/66* (2013.01); *G01V 2001/204* (2013.01); *G01V 2210/1423* (2013.01); *G01V 2210/1427* (2013.01); *H02G 3/0481* (2013.01)

(58) Field of Classification Search
CPC ............................. G01V 1/3808; B63B 21/66
See application file for complete search history.

(56) References Cited

U.S. PATENT DOCUMENTS

| | | | | |
|---|---|---|---|---|
| 6,039,081 A | * | 3/2000 | Albert | F16L 1/123 138/110 |
| 6,139,354 A | * | 10/2000 | Broussard | H01R 13/523 439/447 |
| 9,889,907 B2 | * | 2/2018 | Hubert | B63B 21/66 |
| 2004/0081018 A1 | * | 4/2004 | Sawin | G01V 1/201 367/20 |
| 2014/0334255 A1 | * | 11/2014 | Sacreste | G01V 1/38 367/15 |
| 2015/0020726 A1 | * | 1/2015 | McLemore | B63B 9/04 114/244 |
| 2016/0033660 A1 | * | 2/2016 | Olivier | G01V 1/3852 367/15 |
| 2016/0280334 A1 | * | 9/2016 | Hubert | B63B 21/66 |

OTHER PUBLICATIONS

Office Action in People's Republic of China Application No. 201721293449.7 dated Mar. 21, 2018.

* cited by examiner

*Primary Examiner* — Ian J Lobo
(74) *Attorney, Agent, or Firm* — Patent Portfolio Builders PLLC

(57) ABSTRACT

A restrictor device is used on a cable to protect the cable from excessive bending. The restrictor device includes two or more restrictor members having a helix shape extending along a longitudinal axis X; and fasteners that connect the two or more restrictor members to each other to form the restrictor device. At least one property of the two or more restrictor members is selected such that a bending portion of the restrictor device moves along the restrictor device when a magnitude of a force applied to the restrictor device changes.

17 Claims, 8 Drawing Sheets

CONTROLLED CURVATURE BEND DEVICE AND METHOD

BACKGROUND

Technical Field

Embodiments of the subject matter disclosed herein generally relate to a controlled-curvature bend restrictor device that is mounting on a cable and mitigates excessive stress concentration on the cable resulting from bending derived tension and compressional force.

Discussion of the Background

Marine surveys are used for geophysical prospecting, in particular, when seeking gas and oil reservoirs. Such surveys gather information about sedimentary rock formations using seismic signals. The signals are reflected, refracted and/or transmitted at interfaces in the surveyed geological formation where the signal's propagation velocity changes. Signals emerging from the explored geological formation are detected by receivers and these signals are processed for generating an image of the subsurface. This image shows the various geological formations and helps the oil and gas company to more accurately drill the oil well.

If the geological formations to be surveyed are under the ocean bottom, then a marine seismic survey system is used for collecting the seismic data. There are two main processes for surveying the formations under the ocean bottom. One process uses streamers and sources that are towed under water as discussed next. Another process uses ocean bottom nodes (OBN) located on the ocean bottom and this process is discussed later with regard to FIGS. 4A-B. FIG. 1 illustrates the first process in which a marine seismic survey system 100 includes a vessel 110 that tows a source 120 made of plural individual source elements, e.g., air guns, and a streamer spread 130 that includes streamers 130. Vessel 110 advances along a sail line S.

In order to tow the source and the streamer spread according to a predetermined data-acquisition geometry, a set of cables connect various pieces of this equipment to vessel 110. The term "cable" encompasses various types of cables from simple ropes or chains to complex structures able to transmit power, pressured fluid, signals and/or to convey the strength necessary for towing. Also, the term cable is considered herein to include hoses, wires, and flexible piping. The set of cables (only some are labeled in the figure) includes streamer lead-in cables 140 connecting the streamers 130 to the vessel 110, umbilical cables 150 (only one labeled) connecting the source 120 to the vessel 110, and two wide ropes 160 connecting deflectors 170 to the vessel. Further, cross-line distance ropes 180 limit distances between heads of adjacent streamers, and spur lines 185 limit distances between the left-most and the right-most streamer and the corresponding left-side and right-side deflector. Floats 190 are tied to streamer heads with link ropes (not labeled) for maintaining the streamer's head at a certain depth under water.

All these cables are rolled up when stored on the vessel. When the seismic survey is started, these cables are unrolled and released into the water. Thus, the cables interact with sheaves, winches and/or reels, which apply a certain amount of bending and compressional forces. The ocean waves then exert various forces on the cables, resulting in bending, pulling, pushing, etc. as the vessel advances along sail line S during the seismic survey. At the end of the survey, the cables are rolled up on the vessel, and the vessels are moved to a next location for a new survey. The constant work of these factors (bending, tension and compression forces) on the cables takes its toll, eventually resulting in failure of the cables. The cables used in the ocean bottom seismic acquisition experience similar forces. In fact, cables in many other fields (e.g., telecommunication, appliances, etc.) experience similar type of forces, but with a smaller or larger magnitude.

To mitigate the deleterious effects of handling the cables in all these fields, devices such as bend restrictors or bend limiters are used to control the imposed stresses. These devices can be made from either metal or various elastomeric materials as a single unit. An example would be a spring or plastic overmold or a segmented linkage system.

Devices used in the mitigation of excessive stress concentrations resulting from bending derived tension and compressional force typically fall into one of two classes: bend limiters and bend restrictors. Excessive stress is defined as any stress value that results in a change in the cable beyond the design intent, cosmetic or functional.

Bend restrictors are devices which have no pre-determined lock-up angle. Instead, these devices function by controlling their radius of curvature over a range of loading conditions. Bend restrictors typically require a greater level of engineering as the radius of curvature has to be designed to not exceed the yield stress of the member under bending. The monolithic structure common to bend restrictors limits their installation to the time of initial assembly and as such, repairs are often difficult or not possible at all.

An example of a bend restrictor 200 used in the marine acquisition systems is illustrated in FIG. 2. FIG. 2 illustrates a conventional bend restrictor 200, whose main body 210 protects cable 220's integrity, at a cable attachment location (see collar 230 provided for attaching another cable). Main body 210 is split into two parts closed with screws 240 (only few labeled), designed to ensure bend restrictor's grip on the cable and its mechanical properties.

Bend limiters are devices composed of a linear arrangement of segments which mate in such way as to limit the maximum allowable bend angle (lock-up angle) over the length of the linkage assembly. If the loading is such that the forces are not balanced over the length of the bend limiter, then a sharp bend will occur at the leading edge of the assembly, resulting in a potentially fatal stress concentration. While the inclusion of more segments will provide additional angular support, the added weight, the length and the assembly time are undesirable.

FIG. 3 illustrates a conventional bend limiter 300 that includes plural segments 310 to 380 forming a "vertebrae" along cable 390. Collar 395, from which chains may be attached, is mounted over segment 350. The elements have wider diameters than portions there-between, such as portions 315 and 325. Cable 390's bending radius is limited by the widths of these portions. The elements may be attached to the cable 390 with screws 305. However, these devices suffer of the added weight, their length and the extended assembly time.

Thus, it is desirable to develop new devices that maintain the positive aspects of the restrictor class while suffering none of the typical assembly and repair limitations of monolithic designs.

SUMMARY

According to an embodiment, there is a restrictor device for a cable that includes two or more restrictor members having a helix shape extending along a longitudinal axis X, and fasteners that connect the two or more restrictor members to each other to form the restrictor device. At least one property of the two or more restrictor members is selected such that a bending portion of the restrictor device moves along the restrictor device when a magnitude of a force applied to the restrictor device changes.

According to another embodiment, there is an acquisition system that includes a spread element configured to collect data; a cable connected to the spread element; and a restrictor device connected to the spread element and fully encircling the cable. The restrictor device is configured to protect the cable from excess bending and at least one property of the restrictor device is selected such that a bending portion moves along the restrictor device when a force applied to the restrictor device changes its magnitude.

According to still another embodiment, there is a method for replacing a restrictor device encircling a cable. The method includes disconnecting the restrictor device from a spread element; removing fasteners that connect head and tail regions of two or more restrictor members of the restrictor device, where the two or more restrictor members have a helix shape extending along a longitudinal axis X; replacing one of the two or more restrictor members with a new one; fastening the new restrictor member to the other one of the two or more restrictor members; and connecting the restrictor device to the spread element without attaching it to the cable.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed in the context of marine survey systems. However, similar embodiments and methods may be used for other situations, not related to marine survey systems, in which cable portions are subjected to stress likely causing undesirable bending. Thus, although the following embodiments discuss a restrictor device mainly in the context of an ocean bottom node, the novel features of the restrictor device may be applied to any other field in which a cable experiences stress.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more other embodiments.

According to an embodiment, a controlled curvature bend restrictor device (herein restrictor device for simplicity) has two or more components attached to each other so that a cable that needs to be protected is fully encircled by the restrictor device. The restrictor device is engineered, as discussed later, to have a nearly constant radius of curvature over many loading conditions. This means that if initially a light load is applied to the cable protected by the restrictor device, a distal portion of the restrictor device bends up to a position that is characterized by a radius of curvature R. As the load is increased, the bending portion moves along the restrictor device, toward a proximal portion while substantially maintaining the radius of curvature R. To achieve this nearly constant radius of curvature, the bulk modulus, the material density along one or more dimensional axes, the helix angle (0°-99°) and/or the cross-sectional area of the elements making the restrictor device can be controlled and adjusted as will be discussed later.

Figure 4A:
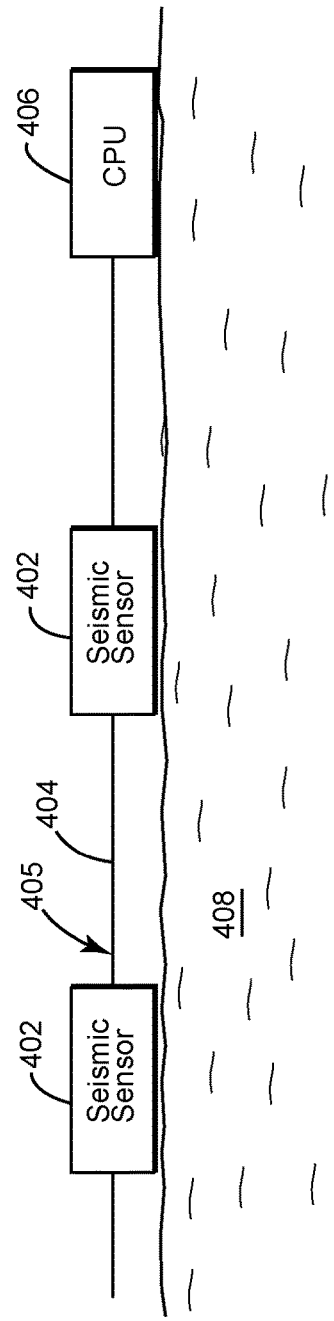
FIG. 4A illustrates an ocean bottom cable that collects seismic data.

A practical implementation of a novel restrictor device is now discussed with reference to FIGS. 4A and 4B. FIG. 4A shows an ocean bottom cable (OBC) system 400 having plural seismic sensors 402 connected to a cable 404. Cable 404 may be connected to a central station 406 that collects the seismic data recorded by the seismic sensors 402. The seismic sensors 402 are located on the ocean bottom 408. The portion 405 of the cable that enters the seismic sensor 402 is traditionally exposed to bending and tensile/compressional stress when the OBC system 400 is deployed or retrieved. Thus, this region is prone to breaking.

Figure 1:
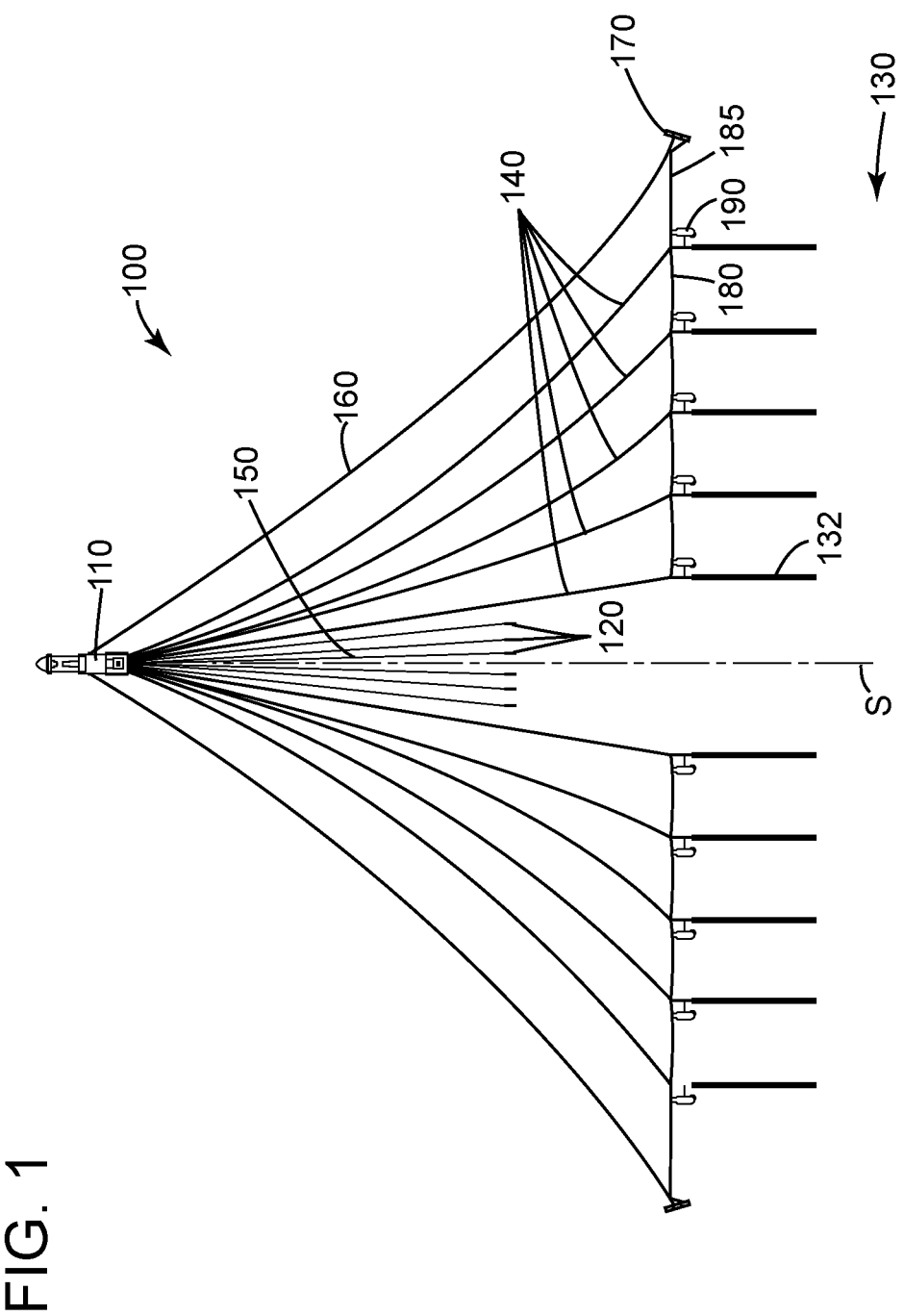
FIG. 1 illustrates a traditional marine seismic survey system.
Figure 2:
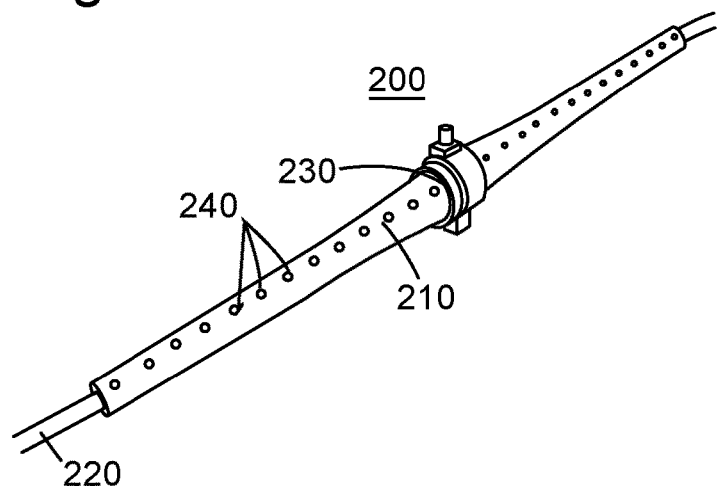
FIG. 2 illustrates a conventional bend stiffener that protects a cable.
Figure 3:
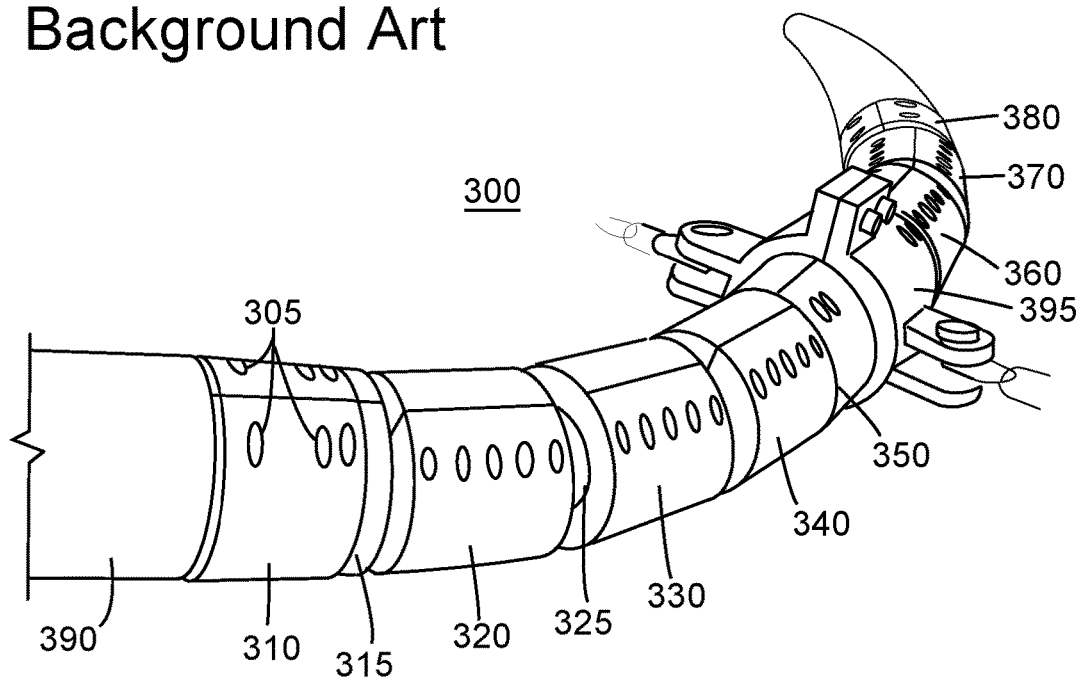
FIG. 3 illustrates a conventional bend restrictor that protects a cable.
Figure 4B:
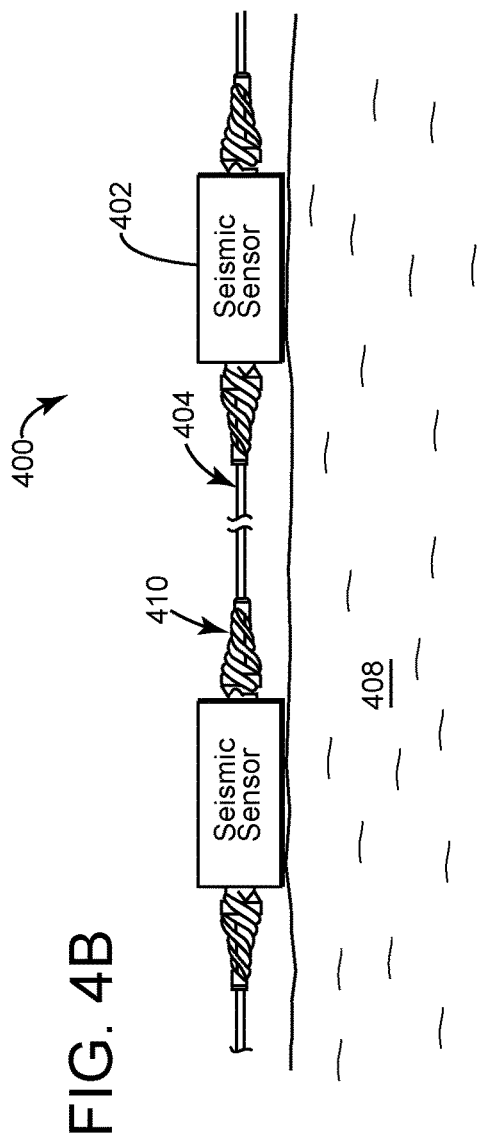
FIG. 4B illustrates the ocean bottom cable with restrictor devices for protecting a cable.

FIG. 4B shows the same OBC system 400 having a restrictor device 410 that limits the bending of portion 405. Restrictor device 410 is mounted outside cable 404 and it can be replaced, in case of damage or failure, without disconnecting the cable 404 from the sensor 402. The same is true if the restrictor device 410 is used to protect other systems, for example, the lead-in 140 of a streamer 132 (see FIG. 1), the umbilical 150 of the source 120 (see also FIG. 1), or any other cable used in a seismic survey (e.g., land seismic survey) or any other cable used in any application where bending is an issue.

Figure 5A:
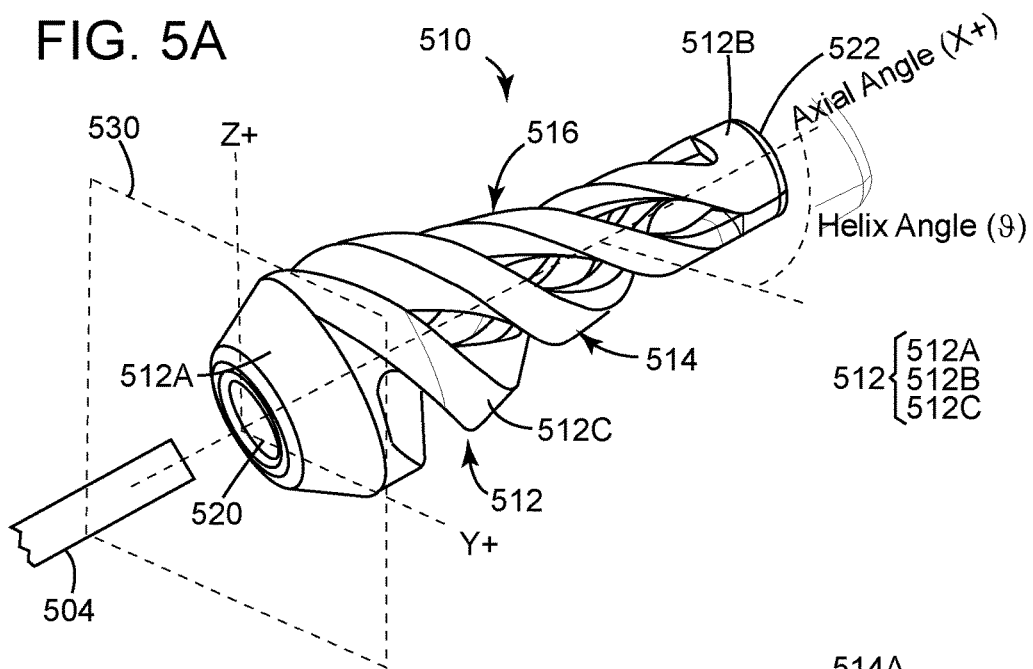
FIGS. 5A-5D illustrate a restrictor device and its members having a controlled curvature that protects a cable from excessive bending.
Figure 5B:
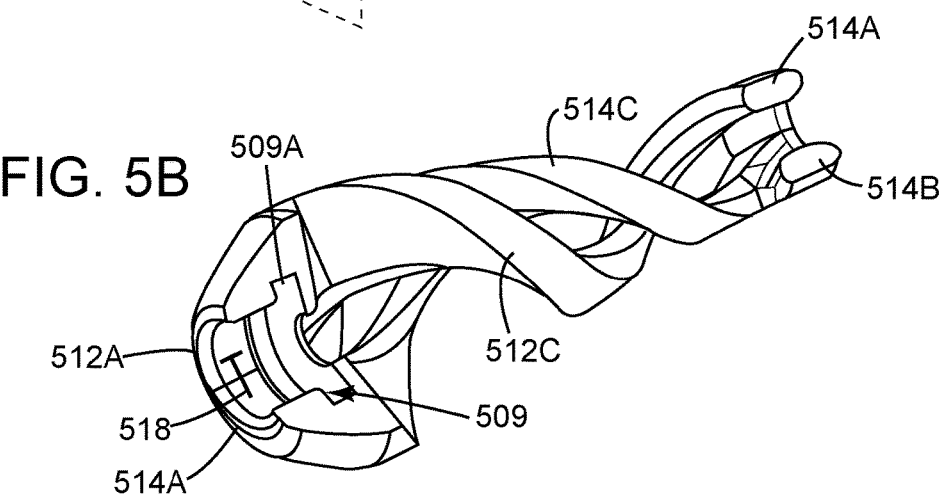
Figure 5C:
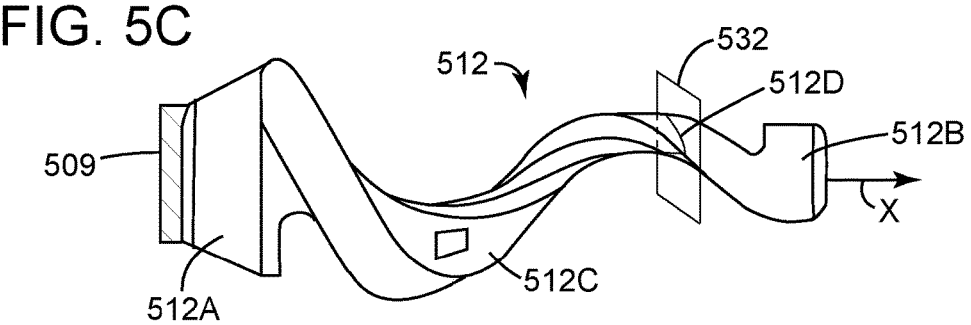

One implementation of the restrictor device is now discussed with regard to FIGS. 5A-C. FIG. 5A shows a fully assembled restrictor device 510. Cable 504, which is protected by the restrictor device, is shown outside the restrictor device for simplicity. The embodiment of FIG. 5A illustrates the restrictor device 510 having three restrictor members 512, 514 and 516. Those skilled in the art would understand that more than three restrictor members may be used to form the restrictor device. In one embodiment, it is possible to have two restrictor members to form the restrictor device.

A restrictor member 512 has a head portion 512A, a tail portion 512B, and a body portion 512C. The head and tail portions of two adjacent restrictor elements are attached to each other, as illustrated in FIG. 5B. A single restrictor member 512 is illustrated in FIG. 5C. All the restrictor members forming a restrictor device are attached to each other, for example, at the head and tail regions. The restrictor members may be attached with any type of fastener 518, e.g., screws, clips, rivets, bands, etc. FIG. 5B schematically illustrates a fastener 518 connecting to each other restrictor members 512 and 514 at their heads. While FIG. 5B shows the fastener 518 only connecting the head portions of the restrictor members, the same fasteners may be used to connect the tail portions. FIG. 5B also shows an attaching mechanism 509 formed in the head portion 512A of the restrictor member 512. In this regard, note slot 509A in FIG. 5B. When assembled, each restrictor member has a similar slot, which together, form a groove. This groove may fit over a corresponding part (not shown) formed in a spread element (e.g., ocean bottom node housing) so that restrictor device 510 is fixedly attached to the spread element. FIG. 5C shows an external attaching mechanism 509 (to be discussed later) that is used to attach the restrictor member to the spread element (not shown) to which cable 504 is attached. The external attaching mechanism may not be part of the restrictor device 510, which is different from the embodiment shown in FIG. 5B. The spread element may be another cable, a housing of a seismic sensor, a connecting part between the streamer and the lead-in, etc. Also, as previously discussed, if this novel concept is applied to another field, the spread element may be any housing (e.g., the housing of a power tool).

When the head regions of the restrictor members are attached to each other as illustrated in FIG. 5A, an inner conduit 520 is formed, which is illustrated in lateral plane 530. Cable 504 is configured to enter conduit 520. In one application, an exterior diameter of cable 504 is smaller than an interior diameter of conduit 520. The same is true for the tail portions, which may form a tail conduit 522.

Figure 5D:
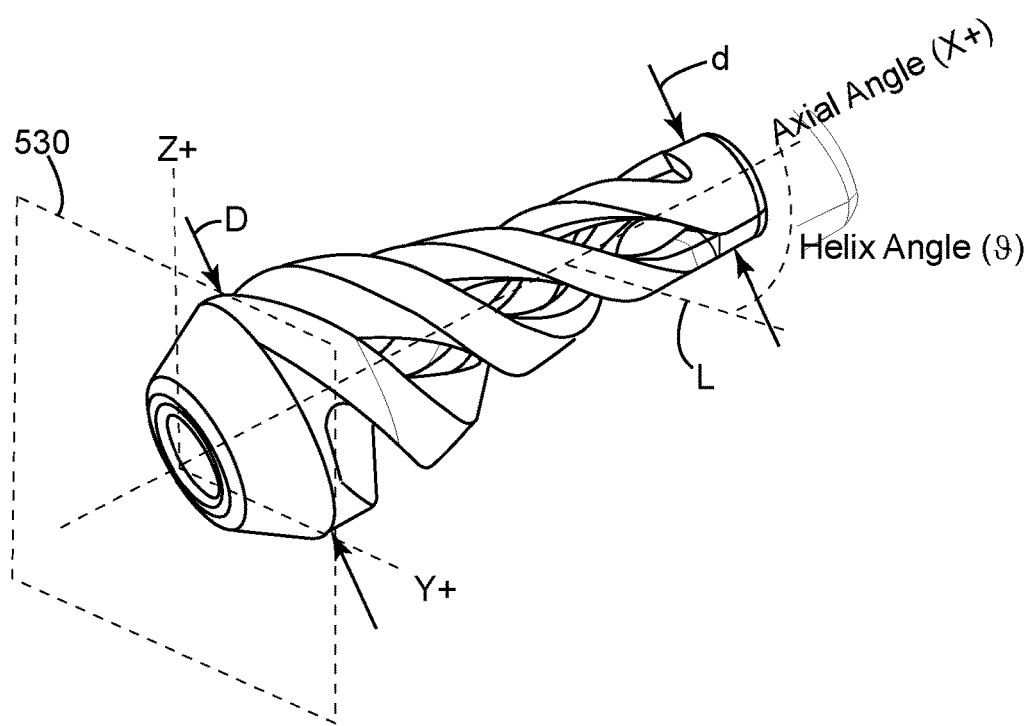

In one embodiment illustrated in FIG. 5D, an external diameter D of the head portions 512A, 514A and 516A is larger than an external diameter d of the tail portions 512B, 514B and 516B. FIG. 5D also shows that each restrictor member has a helix configuration, i.e., the body of each restrictor member follows a helix or spiral. The terms "helix" and "spiral" are considered herein to mean the same thing, i.e., they are interchangeable. A helix can have a constant or variable radius. The restrictor members shown in the figures have a variable interior radius (i.e., a radius of a cross-section of the restrictor member), which decreases from the head toward the tail. Note that FIG. 5D shows the diameter of the restrictor device decreasing from the head toward the tail and the above noted radius is substantially half of this diameter. In one embodiment, the restrictor members can have a constant radius. The definitions noted above are controlling this application and any other definition known in the art should not be used to contradict the above definitions. In other words, the inventors use their right of defining words that should not be ignored or reinterpreted by the reader of this application (the inventors are their own lexicographers for these terms). The helix or spiral angle is illustrated in FIG. 5D as being defined by a longitudinal (or axial) axis (X axis) and a line L that partially extends along the body of the restrictor member. Note that the lateral plane 530 is formed by axes Y and Z in FIG. 5D.

A restrictor member 512 may have one or more of the following properties. A cross-section area 512D through the restrictor member 512, as illustrated in FIG. 5C, may vary along the length of the body 512C or along the entire restrictor member 512. Note that cross-section area 512D is defined, in one embodiment, as an intersection between the body 512C and plane 532, where plane 532 is substantially perpendicular to axis X. In another embodiment, it is possible that cross-section area 512D decreases from the head portion 512A toward the tail portion 512B. In still another embodiment, the cross-section area 512D linearly decreases along axis X. In yet another embodiment, the decrease of the cross-section area is non-linear. It is also possible that the cross-section area is constant along the body 512C.

The material used for the restrictor member may include metal, elastomeric material, plastic, carbon based material, polymer, etc. In one embodiment, a combination of such materials is used to manufacture the restrictor member. In another embodiment, one or more materials are used to manufacture the restrictor member such that one or more material property changes along axis X. For example, the material property may be the density or the bulk modulus. In one embodiment, the helix or spiral angle may change along axis X. As discussed above about the change in cross-section along the axis X, the density, bulk modulus or helix/spiral angle may be changing linearly or non-linearly along the X axis. The exact way in which one or more of these factors change along the X axis is determined based on the desired length of the restrictor member and the desired force and/or bending to withstand. One or more of these factors are selected based on finite element analysis (FEA) of the restrictor device. For example, it is possible to determine the desired properties of the restrictor member by FEA calculations, where these calculations are repeated for different shape and sizes of the restrictor members. Then, all the restrictor devices are manufactured with the found dimensions to achieve the selected material properties. In another words, it is possible to calculate the properties of the restrictor device based on its known characteristics, e.g., density, length, cross-section, bulk modulus, etc. and then, using the FEA calculations, it is possible to change these characteristics until the desired property or properties are obtained. These selected characteristics are used during the manufacturing process for obtaining the restrictor device.

In one embodiment, which is not intended to limit the invention, the restrictor device includes three restrictor members. Each restrictor member in this embodiment is made out of Elastollan (a thermoplastic polyurethane elastomers manufactured by BASF), which has a density of 1.18 g/cm$^3$. The head diameter D of the restrictor device is between 60 and 100 mm, the tail diameter d of the restrictor device is between 20 and 50 mm, a length of the restrictor device (that protects a cable of a streamer or OBC) is between 100 and 200 mm, and a helix angle (or pitch) is between 100 and 150. One restrictor device built by the inventors of this application has the head diameter of 80 mm, the tail diameter of 36 mm, the length of 175 mm and the helix angle of 128. Those skilled in the art would understand that these dimensions have to be scaled up or down depending on the cable that is intended to be protected and also on the material to be used for manufacturing the restrictor members. The material selected for this embodiment has a modulus of 296 Mpa, so that when a load of 1.25 kN is applied at 30 degree angle to the restrictor device, a bending radius of 71 mm was obtained over 74 mm of length (bending portion) of the restrictor device, measured from the head end. This bending portion (which is characterized by length and bending radius) has been observed to move along the restrictor device, while substantially maintaining its characteristics, as a magnitude of the applied force was increased. The term "substantially" is used herein to mean that one or both characteristics of the bending portion have been changed with less than 20% of the initial values noted above. One skilled in the art would understand that by selecting any one or a combination of the density, bulk modulus, cross-section area of the restrictor member, and the helix angle, it is possible to control the characteristics of the bending portion and how it moves along the restrictor device. While the specific numbers provided above constitute just one example of achieving a bending portion that moves along the restrictor device, other examples exist and they can be calculated based on the disclosure of this application, especially the disclosure of the previous paragraph.

Figure 6:
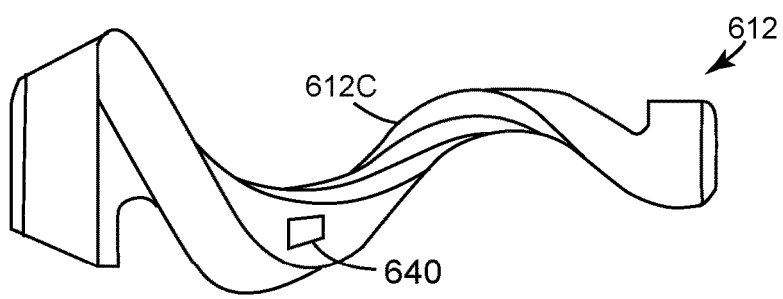
FIG. 6 illustrates a restrictor member having cavities.
Figure 7:
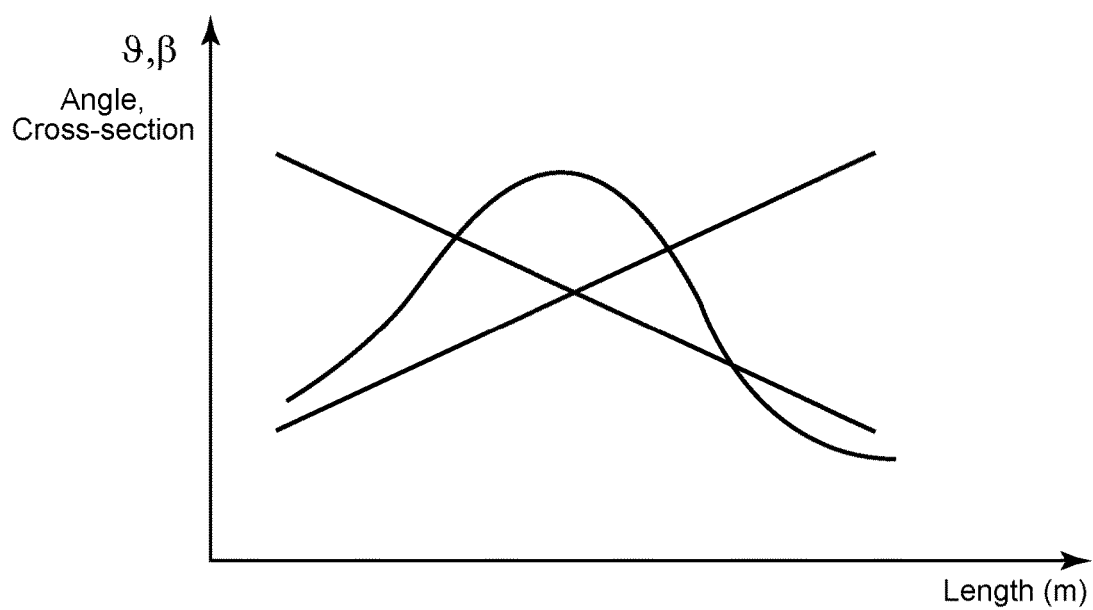
FIG. 7 illustrates how various properties of the restrictor device may be engineered to vary along its length.

In one embodiment, the density of the restrictor member may be varied by creating empty spaces 640, as illustrated in FIG. 6, in the body 612C. FIG. 7 generically illustrates possible linear and non-linear profiles for the properties of each restrictor member, i.e., density ρ, bulk modulus B, helix angle φ, and cross-section of the body. Irrespective of the shape chosen to describe one or more of these properties of the restrictor member, these shapes are controlled shapes, i.e., the restrictor member is engineered to achieve the desired shapes and these shapes are not the result of happenstance. In other words, by carefully selecting one or more of the properties illustrated in FIG. 7, the performance of each restrictor member is set at the manufacturing phase.

Although the restrictor members are shown in the figures as being identical, they do not have to be for as long as uniform protection of the cable in the lateral plane is maintained. The restrictor members may be fabricated with an injection process using an injection molded plastic. However, any other process may be used to manufacture the restrictor members.

Figure 8A:
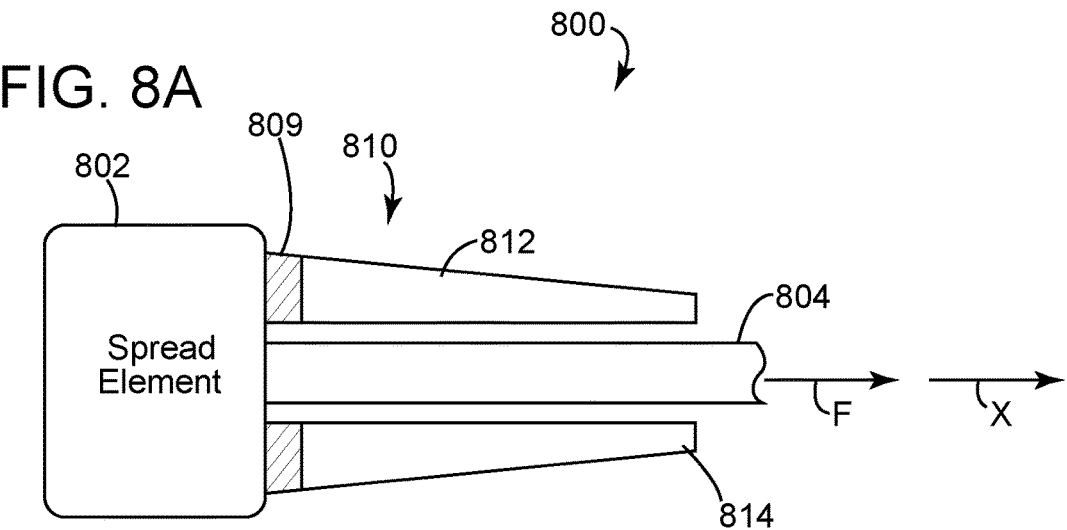
FIGS. 8A-8C illustrate how the restrictor device bends under a given force and how a bending region travels along the restrictor device as the force's magnitude increases.
Figure 8B:
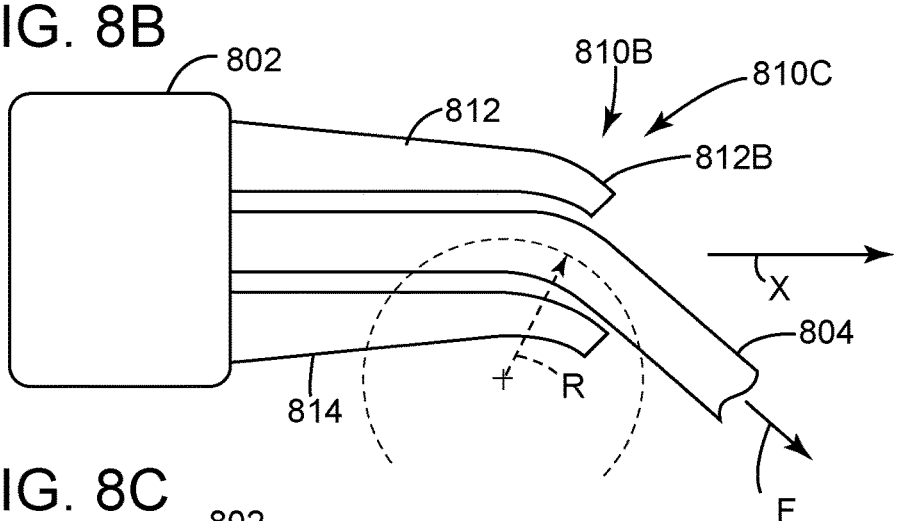
Figure 8C:
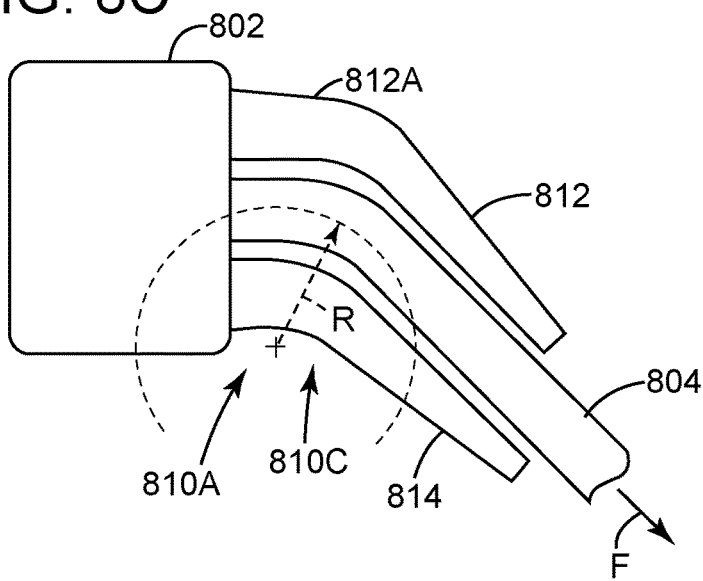

As discussed above, one or more of the properties of the restrictor device may be adjusted so that when a force is applied to the cable protected by the restrictor device, a bending angle of the device is substantially constant and a bending point/region moves along the restrictor device as the force's magnitude is increased. This property is illustrated in FIGS. 8A-8C. FIG. 8A shows a seismic acquisition system 800 that includes a spread element 802 (e.g., seismic sensor tool, streamer, or any other part of the seismic spread) connected to restrictor device 810. External attaching mechanism 809 is used to connect spread element 802 to restrictor device 810. As previously discussed, external attaching mechanism 809 is not part of the restrictor device 810. However, in a previous embodiment, the attaching mechanism 509 was internal, i.e., it was part of the restrictor device (see FIG. 5B). Cable 804 enters spread element 802. Restrictor device 810 is attached with its head to the spread element, but not to the cable. The attachment mechanism can be implemented by any method known in the art. For example, in one embodiment, attaching mechanism 809 may include a collar to attach restrictor device to a rim of the spread element. Many other possibilities exist for attaching the restrictor device to the spread element. Whatever attaching mechanism is used, the cable is free to move inside the restrictor device. Restrictor device 810 is illustrated schematically in the figures having two members 812 and 814. However, as discussed above, the restrictor device can have any number of members. FIG. 8A also shows a force F (tensile or compressive) being applied to cable 804 along an axis X.

FIG. 8B shows the force F making an angle with axis X. Also, a magnitude of force F is low. This means that the tail part 812B (i.e., the tail portion) of the restrictor members are bending to protect the cable for yielding. The force makes the distal part 810B of the restrictor device to bend with a bending radius R. As the magnitude of the force F increases, the bending region 810C moves along the restrictor device, towards its proximal part 810A, as illustrated in FIG. 8C. This portion now bends with substantially the bending radius R. FIGS. 8B and 8C illustrate how the bending portion 810C is at the distal region when the force is small, and it moves towards the proximal region when the force is large. This means that as the force applied on the cable changes, the bending region moves along the restrictor device with substantially the same radius R. The term substantially would be understood by one skilled in the art as being in the range of 5 to 20% of the absolute value of R. Also, those skilled in the art would understand that this property of having a substantially constant bending radius R and/or a bending region that moves along the restrictor device may be achieved by modifying one or more of the density of the restrictor members, their cross-sectional areas, the bulk modulus, and/or the helix/spiral angle relative to the longitudinal axis X.

Thus, the restrictor device presented in the above embodiments is a segmented bend restrictor that maintains the positive aspects of the restrictor class while suffering none of the typical assembly and repair limitations of monolithic designs. This device is mounted outside of the cable and can be replaced in case of damage or failure without disconnecting the cable. The restrictor device is adaptable to various sizes and uses.

Figure 9:
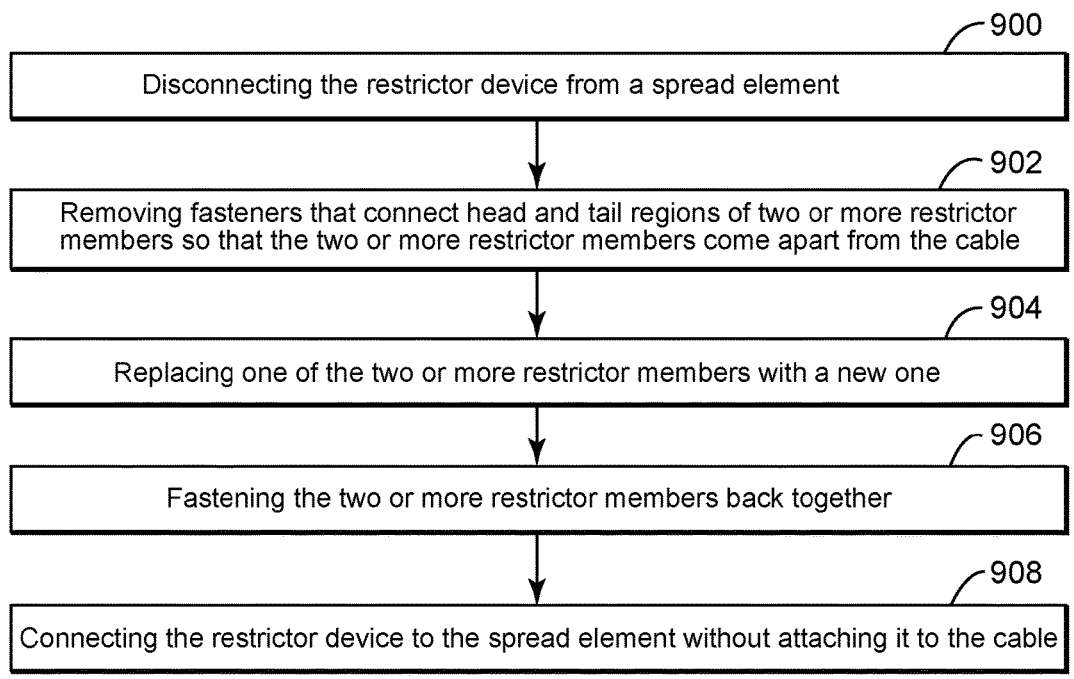
FIG. 9 is a flowchart of a method for replacing a member of a restrictor device in a marine survey system.

A method for changing a restrictor device (e.g., 510, 810) encircling a cable (504, 804) of a marine survey system is now discussed with reference to FIG. 9. The method includes a step 900 of disconnecting the restrictor device 810 from a spread element 802 of the marine survey system, a step 902 of removing fasteners 518 that connect to each other the head and tail regions of two or more restrictor members 512, 514, so that the two or more restrictor members 512, 514 come apart from the cable, a step 904 of replacing one of the two or more restrictor members with a new one, a step 906 of fastening the new one and the other one of the two or more restrictor members together, and a step 908 of connecting the restrictor device to the spread element without attaching it to the cable. During this method, one or more of the two or more restrictor members may be changed with new ones. One would note that the restrictor device can be easily removed from the cable so that the seismic spread does not have to be taken out of commission for long periods of time.

The disclosed exemplary embodiments provide cable-protecting devices configured to quickly attach/detach on cables of marine survey systems. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A restrictor device for a cable, the restrictor device comprising:
   two or more restrictor members having a helix shape extending along a longitudinal axis X;
   each restrictor member having a head portion, a body portion, and a tail portion; and
   the head portions of the two or more restrictor members and the tail portions of the two or more restrictor members being connected to each other, respectively, by fasteners to form the restrictor device,
   wherein at least one property of the two or more restrictor members is selected such that a bending portion of the restrictor device moves along the restrictor device when a magnitude of a force applied to the restrictor device changes.

2. The restrictor device of claim 1, wherein the helix shape has a variable radius, which decreases from a head to a tail portion of the restrictor device.

3. The restrictor device of claim 1, wherein the property is one of density, bulk modulus, cross-section area of a restrictor member, and a helix angle relative to the longitudinal axis.

4. The restrictor device of claim 1, wherein the two or more restrictor members consists of three members.

5. The restrictor device of claim 1, wherein none of the two or more of the restrictor members are attached to the cable.

6. The restrictor device of claim 1, wherein the cable is connected to an ocean bottom node.

7. The restrictor device of claim 1, wherein the cable is a lead-in of a seismic streamer spread.

8. The restrictor device of claim 1, wherein each of the two or more restrictor members has a variable cross-section.

9. The restrictor device of claim 1, wherein each of the two or more restrictor members are made of two or more materials.

10. The restrictor device of claim 1, wherein each of the two or more restrictor members is formed as a single unit.

11. The restrictor device of claim 1, wherein the bending portion has a substantially constant bending radius (R) as the force is changing its magnitude and the two or more restrictor members are made of Elastollan material, which has a density of 1.18 $g/cm^3$, a head diameter D of the restrictor device is between 60 and 100 mm, a tail diameter d of the restrictor device is between 20 and 50 mm, a length of the restrictor device is between 100 and 200 mm, and a helix angle is between 100 and 150.

12. The restrictor device of claim 1, wherein the two or more restricting members fully encircle the cable.

13. A seismic acquisition system comprising:
   a spread element configured to collect seismic data;
   a cable connected to the spread element; and
   a restrictor device connected to the spread element and fully encircling the cable,
   wherein the restrictor device is configured to protect the cable from excess bending and at least one property of the restrictor device is selected such that a bending portion moves along the restrictor device when a force applied to the restrictor device changes its magnitude,
   wherein the restrictor device includes two or more restrictor members, each restrictor member having a head portion, a body portion, and a tail portion, and
   wherein the head portions of the two or more restrictor members and the tail portions of the two or more restrictor members are connected to each other, respectively, by fasteners to form the restrictor device, and
   the two or more restrictor members have a helix shape extending along a longitudinal axis X.

14. The seismic acquisition system of claim 13, wherein the spread element is a seismic sensor.

15. The seismic acquisition system of claim 13, wherein the spread element is a lead-in of a streamer spread.

16. The seismic acquisition system of claim 13, wherein the helix shape has a variable radius, which decreases from the head portion to the tail portion of the restrictor device, and wherein the property is one of density, bulk modulus, cross-section area of a restrictor member, and a helix angle relative to the longitudinal axis.

17. The seismic acquisition system of claim 13, wherein the bending portion has a substantially constant bending radius (R) as the force is changing its magnitude.

* * * * *